Figure 7:
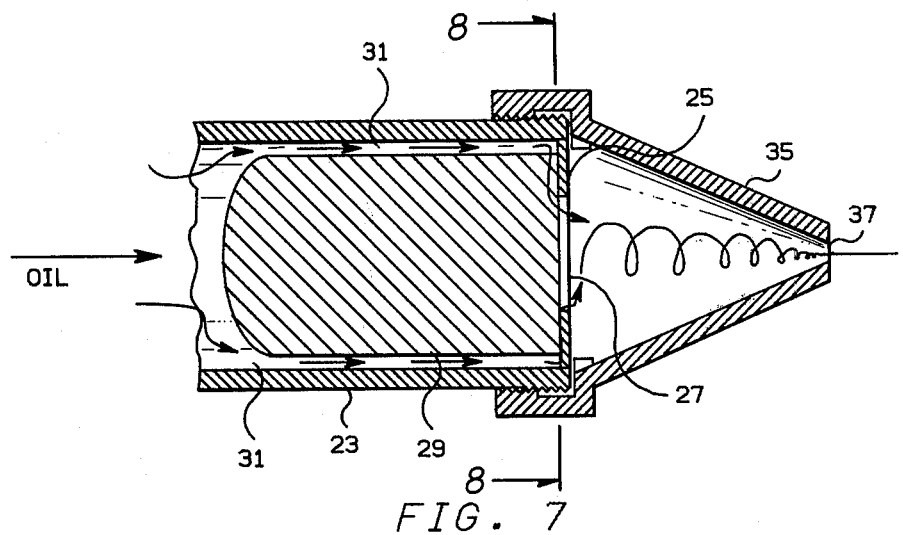

United States Patent [19]

Cheng

[11] 4,321,248

[45] Mar. 23, 1982

[54] METHOD FOR VORTEX FLOW CARBON BLACK PRODUCTION

[75] Inventor: Paul J. Cheng, Bartlesville, Okla.

[73] Assignee: Phillips Petroleum Company, Bartlesville, Okla.

[21] Appl. No.: 145,094

[22] Filed: Apr. 30, 1980

[51] Int. Cl.³ .................... C01B 31/02; C09C 1/48
[52] U.S. Cl. ..................... 423/456; 423/450; 423/455
[58] Field of Search ............... 423/449, 450, 455, 456; 422/150

[56] References Cited

U.S. PATENT DOCUMENTS

| | | | |
|---|---|---|---|
| 2,515,813 | 7/1950 | Wiant | 158/1.5 |
| 2,564,700 | 8/1951 | Krejci | 23/209.4 |
| 2,641,534 | 6/1953 | Krejci | 23/209.4 |
| 2,659,663 | 11/1953 | Heller | 23/209.4 |
| 2,785,054 | 3/1957 | Bethea et al. | 23/209.4 |
| 2,794,710 | 6/1957 | Lawson | 23/209.4 |
| 3,011,872 | 12/1961 | Webster | 23/209.4 |
| 3,051,556 | 8/1962 | Whitsel | 23/259.5 |
| 3,098,883 | 7/1963 | Heuse et al. | 260/683 |
| 3,264,063 | 8/1966 | Schirmer et al. | 423/456 |
| 3,443,901 | 5/1969 | Wendell et al. | 423/455 |
| 3,486,853 | 12/1969 | Henderson et al. | 423/455 |
| 3,522,005 | 7/1970 | Braddock | 23/209.4 |
| 3,721,529 | 3/1973 | Kraus | 23/259.5 |
| 3,753,658 | 8/1973 | Henderson et al. | 23/259.5 |
| 4,030,889 | 6/1977 | Gunnell | 23/259 |

Primary Examiner—Earl C. Thomas
Assistant Examiner—Gregory A. Heller

[57] ABSTRACT

A method and apparatus for producing carbon black in which combustion gas is introduced into a precombustion or combustion zone of a carbon black reactor in a manner to produce a vortex of combustion gases traveling axially through said reactor and a flow of fluid which contains feedstock is introduced into the reactor in a manner to produce another axially moving vortex internal to the combustion gas vortex with both of these vortices passed through a combustion zone to produce carbon black. In embodiments of the invention, method and apparatus for producing a vortex of feedstock, a vortex of cooling air interfaced with axially flowing feedstock, or combined vortices of feedstock and cooling air. In embodiments of the invention, feedstock and/or cooling air are given the same rotational flow as that of the combustion gases to produce carbon black of decreased structure or the feedstock and/or coolig air are given counter-rotational flow to that of the combustion gases to reduce ash deposit in the carbon black reactor.

5 Claims, 9 Drawing Figures

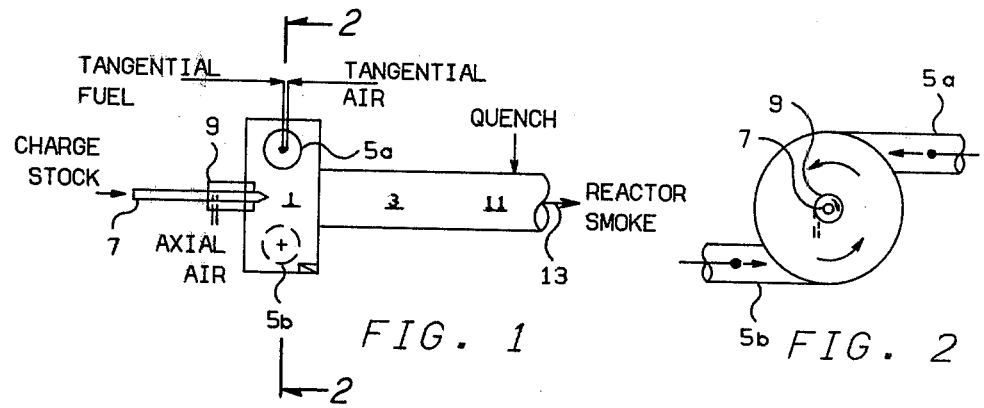
FIG. 1
FIG. 2
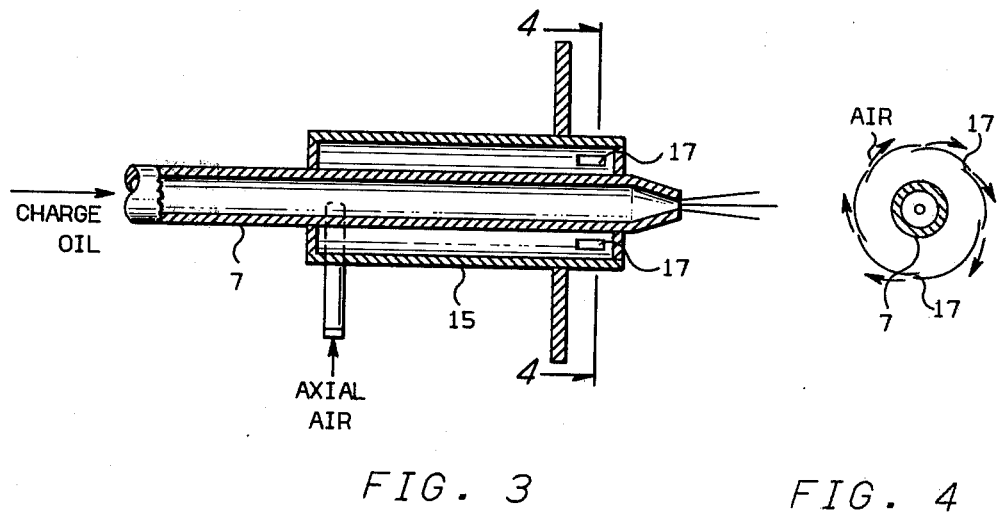
FIG. 3
FIG. 4
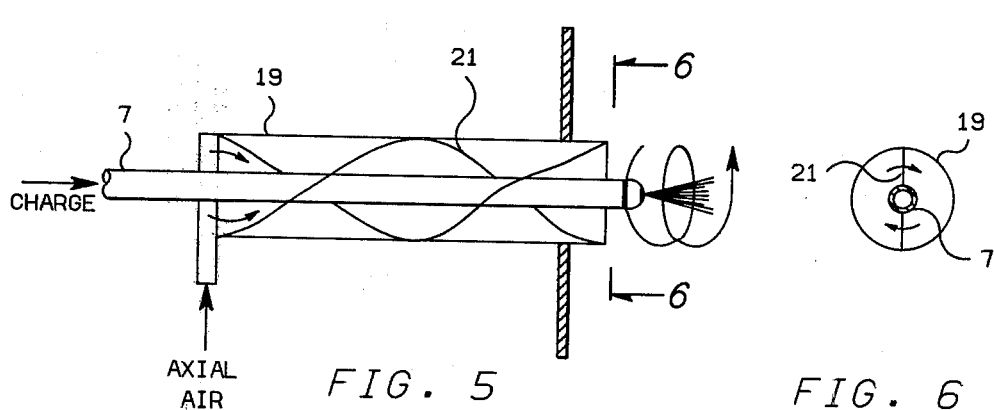
FIG. 5
FIG. 6

METHOD FOR VORTEX FLOW CARBON BLACK PRODUCTION

BACKGROUND OF THE INVENTION

This invention relates to carbon black production. In one of its aspects this invention relates to apparatus for carbon black production. In another of its aspects this invention relates to the use of vortex flow in carbon black reactors. In still another aspect of the invention it relates to affecting the total angular momentum rate of the flowing mass in a carbon black reactor. In yet another aspect of the invention it relates to affecting the deposition of ash in a carbon black reactor.

In well known processes for the production of carbon black such as that disclosed in U.S. Pat. No. 2,564,700, hot combustion gases are charged to an oil furnace carbon black reactor in a tangential manner to form a vortex-flow of hot combustion gases within the combustion or precombustion zone of a carbon black reactor. Feedstock is injected axially into this vortex of hot combustion gases with axial air flow added around the feedstock injection means as a cooling medium to protect the feedstock injection means from excessive heat from the hot combustion gases. The carbon black formation reaction occurs, the reaction mass is quenched to stop further reactions, and the produced carbon black is recovered for use in such products as rubber compounds for tires and the like.

It has now been found that by affecting the angular momentum rate of the combustion gas vortex that the operation of the carbon black reactor can be greatly affected. The angular momentum rate of the mass in the reactor is affected by causing a vortex to be formed of either the feedstock, the cooling air, or both. Depending on whether the rotation of the vortex of these materials, created internally to the vortex of the hot combustion gases, is oriented in the same rotation as the combustion gases or in a counter-rotation to the combustion gases there is a respective increase in the total angular momentum rate of the mass in the reactor or a decrease in the total angular momentum rate of the mass in the reactor. Either of these conditions can have a profound effect on the operation of the carbon black reactor.

For instance, it has been found that the tangential flow of combustion gases can cause rapid ash deposition on the ceramic walls of a reacting unit when high ash-containing feed oils are used. This deposition cannot be tolerated because it results in the sloughing of the ceramic with inorganic material being carried into the carbon black product thereby increasing the "grit" content of the product. It also results in a rapid deterioration of the reactor configuration. A discussion of the slagging of ceramics or refractories used to line carbon black reactors caused by inorganic material such as cracking catalysts, sand, and the like is discussed in U.S. Pat. No. 2,794,710.

It has been found that by decreasing the strong centrifugal force developed within the combustion and precombustion chambers of a carbon black reactor without decreasing the flow of the combustion gases, i.e., maintaining the same quantity of air-fuel flow to produce the same quantity of hot combustion gases thereby producing with the same oil feed rate the same carbon black particle sizes, that deposition of ash can be minimized. This is particularly important in the production of small particle carbon black in which process the tangentially introduced hot combustion gases have very high vortex strength. By the use of the method and apparatus of the present invention the effect of the vortex flow of hot combustion gases can be decreased thereby minimizing the deposition of ash materials in the feedstock onto the lining of the reactor.

In operational carbon black reactors in which a vortex of hot combustion gases is used and in which grit is not a problem the feedstock and/or cooling air can be given the same rotational flow as that of the hot combustion gases thereby increasing the total angular momentum rate of the mass in the reactor. This increased vortex strength can, in many operations, decrease the structure of the carbon black produced.

It is therefore an object of this invention to provide method and apparatus for affecting the angular momentum rate of the mass in the reactor. It is another object of this invention to provide method and apparatus for reducing the high vortex strength of tangentially introduced hot combustion gases in a carbon black reactor. It is another object of this invention to provide method and apparatus for reducing slagging problems in carbon black production operations wherein feedstocks containing solid contaminants are used. It is another object of this invention to provide method and apparatus for increasing the vortex strength of tangential combustion gases in the production of carbon black. It is still another object of this invention to provide a method and apparatus for producing carbon black of decreased structure.

Other aspects, objects, and the various advantages of this invention will become apparent upon studying this specification, the drawings, and the appended claims.

Figure 8:
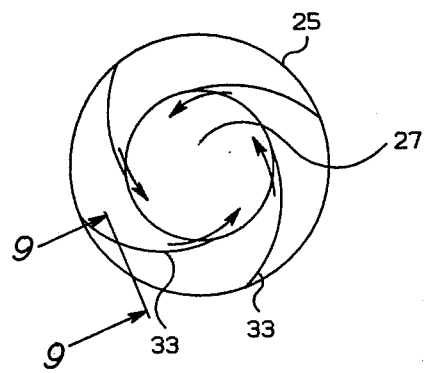
Figure 9:
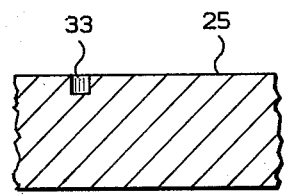

There are nine figures in the drawing illustrating this invention:

FIGS. 1 and 2 illustrate a typical vortex flow oil furnace carbon black reactor, FIGS. 3 and 4 illustrate means for adding air in counter-rotational flow relationship to the tangentially introduced hot combustion gases, FIGS. 5 and 6 illustrate the means for admitting tangential air flow into the reactor that is counter-rotational to the tangential hot combustion gases, FIGS. 7, 8 and 9 illustrate a nozzle means for effecting counter-rotational flow of feedstock in respect to tangentially added hot combustion gases.

STATEMENT OF THE INVENTION

According to this invention, a method is provided for producing carbon black in which combustion gas is introduced in a precombustion or combustion zone of a carbon black reactor in a manner to produce a vortex of combustion gases traveling axially in the reactor and a flow of a fluid which contains feedstock is introduced internally to the combustion gas vortex in a manner to produce a vortex moving axially through the reactor with both of these vortices passed through a combustion zone to produce carbon black.

In an embodiment of the invention the vortex fluid containing feedstock is produced with counter-rotational movement in relation to the combustion gas vortex. This produces a decrease in the angular momentum rate of the tangential combustion gas flow thereby reducing rapid ash deposition on the walls of the reactor when high ash-containing feedstocks are used.

In another embodiment of the invention the vortex fluid containing feedstock is introduced into the reactor in a manner to produce a vortex having the same rotation as a combustion gas vortex thereby increasing the total angular momentum rate of the mass in the reactor. This increase in vortex strength contributes to a decrease in the structure of carbon black produced.

In another embodiment of the invention, apparatus is provided in a carbon black reactor having, at least, a combustion zone in which there are means for introducing combustion gas into the carbon black reactor and either a precombustion or combustion zone in a manner to produce a vortex of combustion gases traveling axially through the reactor and means for introducing internally to the combustion gas vortex a flow of fluid which contains feedstock to produce a vortex moving axially through the reactor. The means for introducing the fluid which contains feedstock can be oriented so that the vortex it produces is either counter-rotational to the combustion gas vortex or is of the same rotation as the combustion gas vortex.

This invention can best be understood in conjunction with the drawings.

Referring now to FIG. 1 and FIG. 2 which illustrate a typical vortex flow oil furnace carbon black reactor as previously known in the art in which a cylindrical, precombustion zone 1 opens in coaxial alignment into a cylindrical reaction zone 3. Combustion gases are introduced into the precombustion zone 1 by tangential inlet lines 5a and 5b which are further illustrated in FIG. 2 which is a Section 2—2 from FIG. 1. In the process of the prior art the tangential entry of the combustion gases into the cylindrical precombustion chamber provides, as illustrated here, a counterclockwise motion of these gases so that they pass through the precombustion and combustion zones as a counterclockwise rotating vortex. Feedstock enters precombustion zone 1 through axially aligned inlet 7 and supplemental air enters the precombustion zone 1 through inlet 9 to provide an axial flow of cooling air between the vortex of combustion gases and the axially flowing feedstock. As these streams travel through the reactor there is interface action between the streams so that the feedstock is reacted into carbon black with the reaction quenched by contact with coolant at 11 and with removal of product through outlet 13.

The process is modified by the present invention by substituting apparatus for the feedstock inlet 7 and/or the cooling air inlet 9 that modifies the flow pattern to produce rotational flow from one or both of these inlets. In this manner, depending on whether the rotation is produced in the same direction as the flow in the vortex of combustion gases or in a counter direction, the total angular momentum rate of the mass in the reactor can be decreased or augmented without changing the volumetric relationship between these flows.

Referring now to FIG. 3 an apparatus is provided in which the feed charge stock passes into the reactor through a coaxially aligned tube 7 which is identical to that set forth in FIG 1. The cooling air, however, enters the chamber 15 which terminates in tangential slots 17 which can best be appreciated in Section 4—4 which is shown in FIG. 4. The flow of cooling air through the multiplicity of tangential slots 17 produces a vortex which is smaller in circumference than that produced by the combustion gases entering through tangential openings 5a and 5b so that a vortex of cooling air surrounds the axially flowing charge stock and interfaces with the larger vortex of combustion gases.

In one of the embodiments of this invention under the conditions in which solid particles form a part of the feedstock the tangentially flowing combustion gas produces a vortex that picks up the solid particles that have migrated from the axially flowing feedstock into the axially flowing cooling air and literally "flings" the solid particles against the reactor wall thereby creating the conditions under which the reactor wall can be seriously damaged by slagging and spalling.

It can be seen that by creating a vortex of cooling air moving in a direction counter-rotational to the combustion gases that a buffer zone is created that imparts a rotational flow to the solid particles taken from the axially flowing feedstock that is counter-rotational to the large volume of combustion gases. Since the solid particles must be relieved of their counter-rotational energy on being taken up by the vortex of combustion gases there is a greater probability that the solids will be turned to ash before reaching the reactor wall than was the case when the solid particles were not given a counter-rotational flow by the cooling gas. There is, therefore, less chance of impinging material on the reactor walls that will cause slagging with ensuing spalling and production of grit to contaminate the carbon black produced in the reactor.

Conversely, by reversing the tangential outlets 17 so that flow is directed to produce a vortex traveling in the same direction as the combustion gas vortex the total angular momentum rate of fluid in the reactor can be augmented so that feedstocks that do not contain perishable solid particles can be reacted into smaller particles of carbon black than can be produced without the augmented vortex flow thereby producing carbon black having decreased structure.

Referring now to FIG. 5 another apparatus is illustrated which also surrounds the coaxial feedstock inlet 7 with a cooling gas inlet 19 that is comprised of a double helix 21 so that cooling air flowing into the upstream end of the cooling gas inlet 19 is directed into a helical flow, as above, producing a vortex of cooling gas flowing around the axial flow of the feedstock. This flow is illustrated in the view of Section 6—6 which is FIG. 6. Again, by reversing the spiral of the helices the flow within the cooling gas inlet 19 surrounding the feedstock inlet 7 can be reversed.

Referring now to FIGS. 7, 8 and 9, apparatus is shown which is used to impart a spiral flow in the feedstock. This apparatus 23 is to be substituted for the axial flow producing feedstock inlet 7 of FIG. 1. This apparatus is made up of a coaxially oriented tube 23 having a closed end 25 having an opening 27 centered therein and against which on the upstream side a plug 29 is permanently affixed. The plug is larger than the concentric with the opening in the outlet plate. The plug is also of a diameter sufficiently smaller than the internal diameter of the feedstock inlet to allow flow in an annulus 31 formed between the outer diameter of the plug 29 and the inner wall of the inlet 23. On either the upstream face of the inlet plate or the downstream face of the plug spiral grooves 33 are cut as illustrated in FIG. 8 and in Section 99 which is FIG. 9. These spiral grooves are aligned to provide flow of feedstock to which is imparted a spiral flow, which on the exit on the opening 27 is directed by truncated conical nozzle 35 through the opening 37 at the truncated end of the cone to produce a vortex of feedstock. The spiral grooves can be directed in the opposite direction from the vortex flow of the combustion gases or in the same direction by a reversal of the spiral of the grooves. Of course, other devices such as the use of a double helix in the outlet truncated cone are also possible to produce similar vortex flows.

As has been stated before, the flow of feedstock or the flow of cooling air or both can be directed to either decrease or augment the total angular momentum rate of reactants flowing through the carbon black reactor. Although the concept of this invention permits any combination of flow of clockwise or counterclockwise vortices of combustion gases with axial, counter-rotational, or co-rotational flow with either or both the cooling air and/or feedstocks, specific desired results have been stated above which, at present, are a practical guide for using the combinations of flow.

The following is a calculated example describing how the invention decreases the vortex effect of the tangentially added hot combustion gases as compared to a conventional operation wherein no decrease is effected on the combustion gas vortex.

EXAMPLE I

|  | Base Without Axial Air and Oil Contra-vortex Flow | Invention With Axial Air and Oil Contra-vortex Flow |
| --- | --- | --- |
| Precombustion Zone: |  |  |
| Diameter, inches, | 24 | 24 |
| Length, inches, | 12 | 12 |
| Tangential Inlets (2), diam, inches, | 12 | 12 |
| Total Tang. Air, SCF/Hr., | 220,000 | 220,000 |
| Total Tang. Natural Gas, SCF/Hr., | 14,670 | 14,670 |
| Axial Air, SCF/Hr., | 12,000 | 12,000 |
| Feed Oil (−0.6 API), Gal/Hr., | 350 | 350 |
| Axial Air Pipe, Diam, inches, | 8 | 8 |
| Angular Momenta Rate In Lb.Ft$^2$/Sec$^2$: |  |  |
| Total Tangential Gases (Vortex) | +668 | +668 |
| Axial Air | — | −106 |
| Axial Oil | — | −75 |
| Total Angular Momentum | +668 | +487 |
| % Original Vortex | 100 | 73[a] |

[a]Can Decrease hot tangential gas angular monentum, in this example, by 27%

Preferred Range is decreased by 10 to 30% when needed due to catalyst and/or ash in feedstock.

While operating the carbon black reactor, when the grit (ceramic grit) content of the produced carbon black increases to a preselected allowable maximum, the invention is then applied so that a decrease in grit will be effected to prevent the grit content from exceeding this preselected (as in customers' specifications) value for grit.

It is pointed out that grit includes carbonaceous grit and inorganic grit. The invention can decrease also carbonaceous grit, since there will be fewer droplets of feedstock reaching the ceramic surface, which contact of oil with the hot ceramic is one known source of carbonaceous grit.

Usually a decrease of the hot tangential gases angular momentum rate by 10 to about 30 percent as effected by this invention is sufficient to minimize grit production.

EXAMPLE II

| (Calculated) Increased Vortex | Base Without Axial Air and Oil Co-vortex Flow | Invention With Axial Air and Oil Co-vortex Flow |
| --- | --- | --- |
| Precombustion Zone: |  |  |
| Diameter, inches, | 24 | 24 |
| Length, inches, | 12 | 12 |
| Tangential Inlets (2), diam, inches, | 12 | 12 |
| Total Tang. Air, SCF/Hr., | 220,000 | 220,000 |
| Total Tang. Natural Gas, SCF | 14,670 | 14,670 |
| Axial Air, SCF/Hr., | 12,000 | 12,000 |
| Feed Oil (−0.6 API), Gal/Hr., | 350 | 350 |
| Axial Air Pipe, Diam, inches, | 8 | 8 |
| Angular Momenta Rate In Lb.Ft$^2$/Sec$^2$: |  |  |
| Total Tangential Gases (Vortex) | +668 | +668 |
| Axial Air | — | +106 |
| Axial Oil | — | +75 |
| Total Angular Momentum | +668 | +849 |
| % Original Vortex | 100 | 127[a] |

[a]Can Increase hot tangential gas angular momentum, in this example by 27%.

The term "structure" used in this invention is defined in ASTM 3053-72 as the state of agglomeration of particles in carbon black.

I claim:

1. A method for producing carbon black comprising:
   (a) introducing combustion gas in a precombustion or combustion zone of a carbon black reactor in a manner to produce a vortex of combustion gases traveling axially in said reactor,
   (b) introducing internally to said combustion gas vortex (1) an axial flow of feedstock and surrounding this feedstock (2) a vortex of air to produce a flow of fluid which contains feedstock and air in a vortex moving axially in said reactor in the same direction as the vortex of combustion gases produced in (a), and
   (c) passing said vortices through a combustion zone under conditions to produce carbon black.

2. A method of claim 1 for minimizing ash deposits in a carbon black reactor comprising introducing said flow of fluid which contains feedstock and air in a vortex counter-rotational to the combustion gas vortex.

3. A method of claim 1 for providing a decrease in structure of carbon black produced wherein said fluid which contains feedstock is introduced in a vortex of the same rotation as the combustion gas vortex.

4. A method of claim 1, 2 or 3 wherein said fluid which contains feedstock and air comprises an oil feedstock and air.

5. A method of claim 4 wherein said fluid which contains feedstock and air comprises a vortex of air into which axially flowing feedstock is interfaced.

* * * * *